Figure 1:
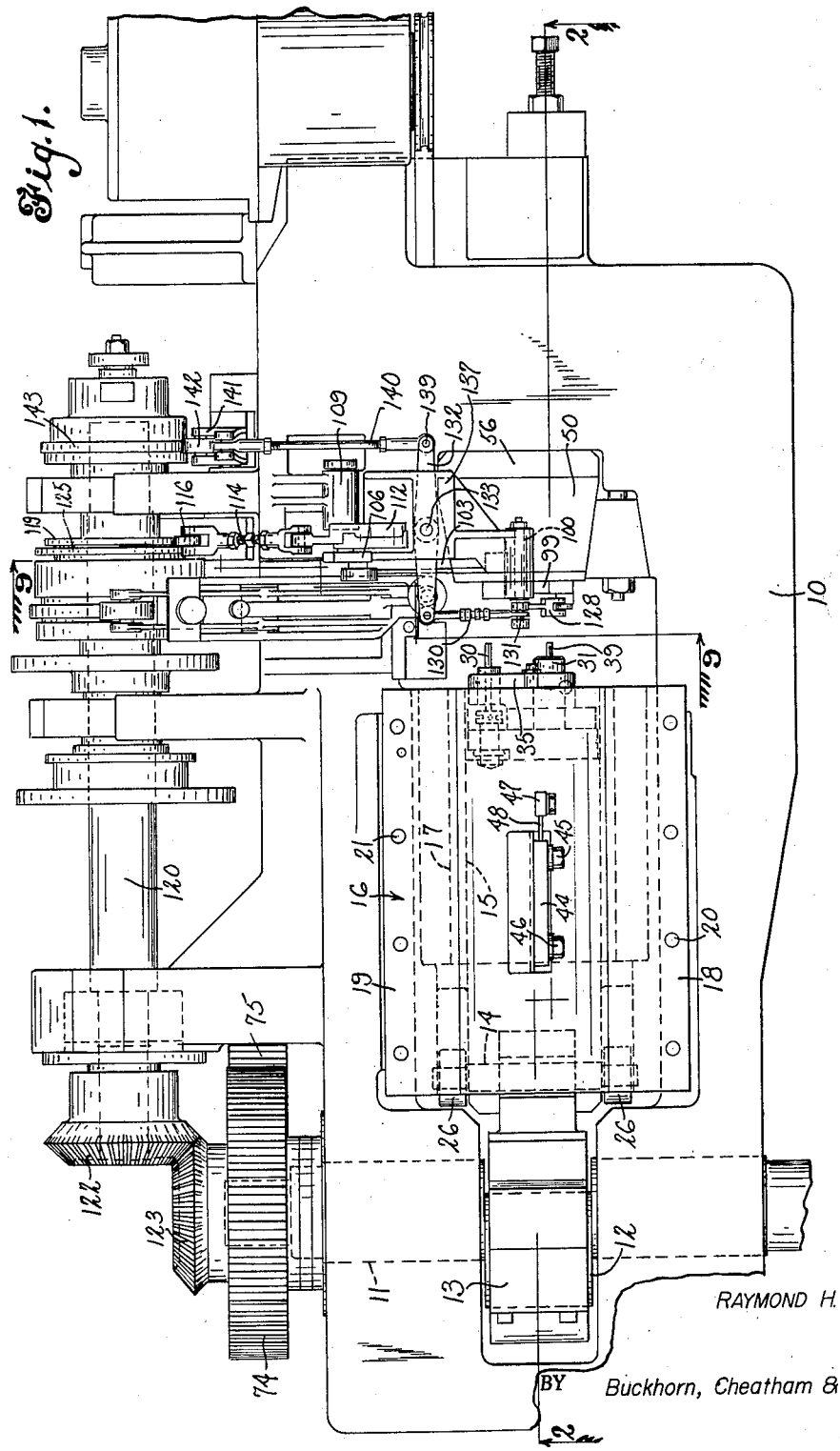

Nov. 24, 1964   R. H. CARLSON   3,157,892
MACHINE FOR FORMING METAL ARTICLES
Filed Feb. 1, 1960   6 Sheets-Sheet 1

INVENTOR
RAYMOND H. CARLSON
BY Buckhorn, Cheatham & Blore
ATTORNEYS

Nov. 24, 1964  R. H. CARLSON  3,157,892
MACHINE FOR FORMING METAL ARTICLES
Filed Feb. 1, 1960  6 Sheets-Sheet 2

INVENTOR
RAYMOND H. CARLSON
BY Buckhorn, Cheatham & Blore
ATTORNEYS

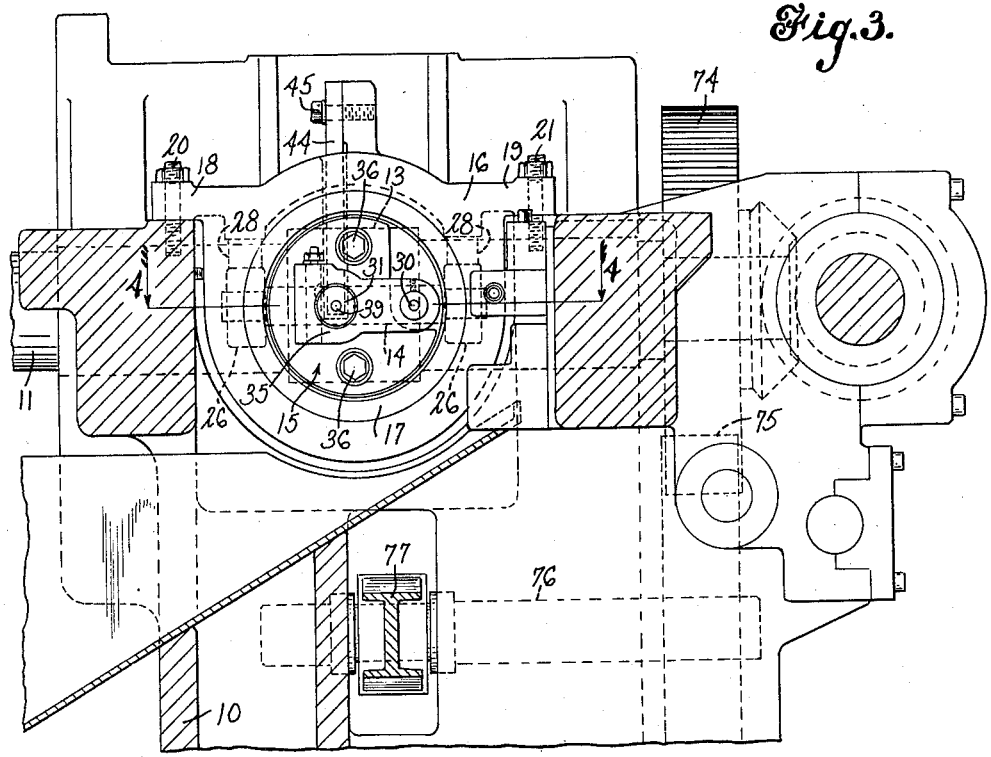

Nov. 24, 1964     R. H. CARLSON     3,157,892
MACHINE FOR FORMING METAL ARTICLES
Filed Feb. 1, 1960     6 Sheets-Sheet 4
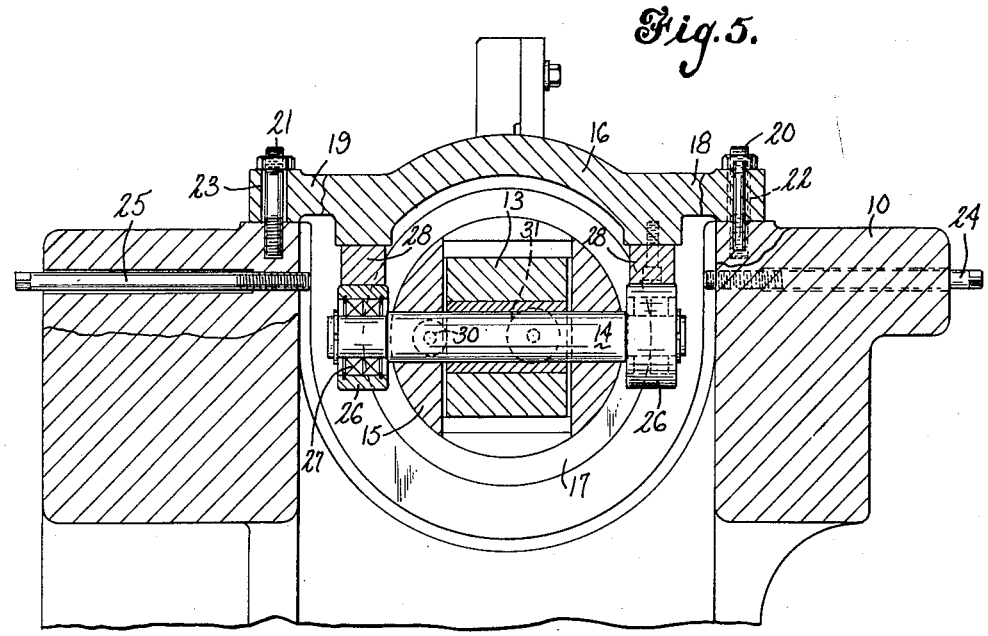
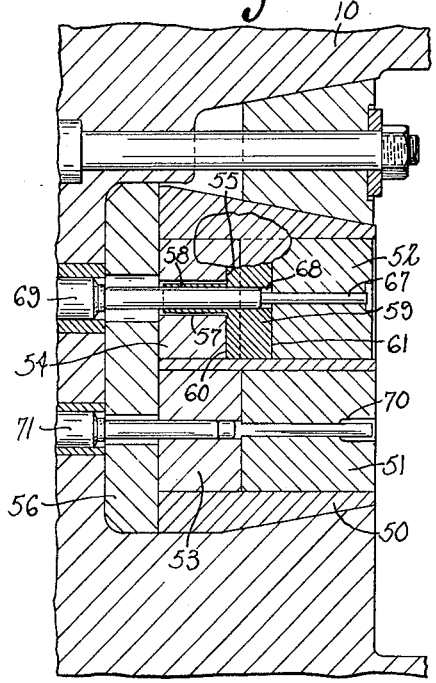
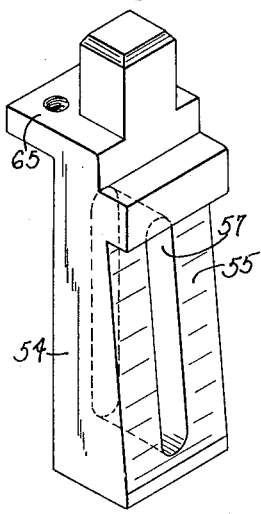
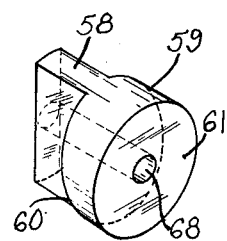
INVENTOR
RAYMOND H. CARLSON
BY Buckhorn, Cheatham & Blore
ATTORNEYS Nov. 24, 1964   R. H. CARLSON   3,157,892
MACHINE FOR FORMING METAL ARTICLES
Filed Feb. 1, 1960   6 Sheets-Sheet 5

INVENTOR
RAYMOND H. CARLSON
BY Buckhorn, Cheatham & Blore
ATTORNEYS

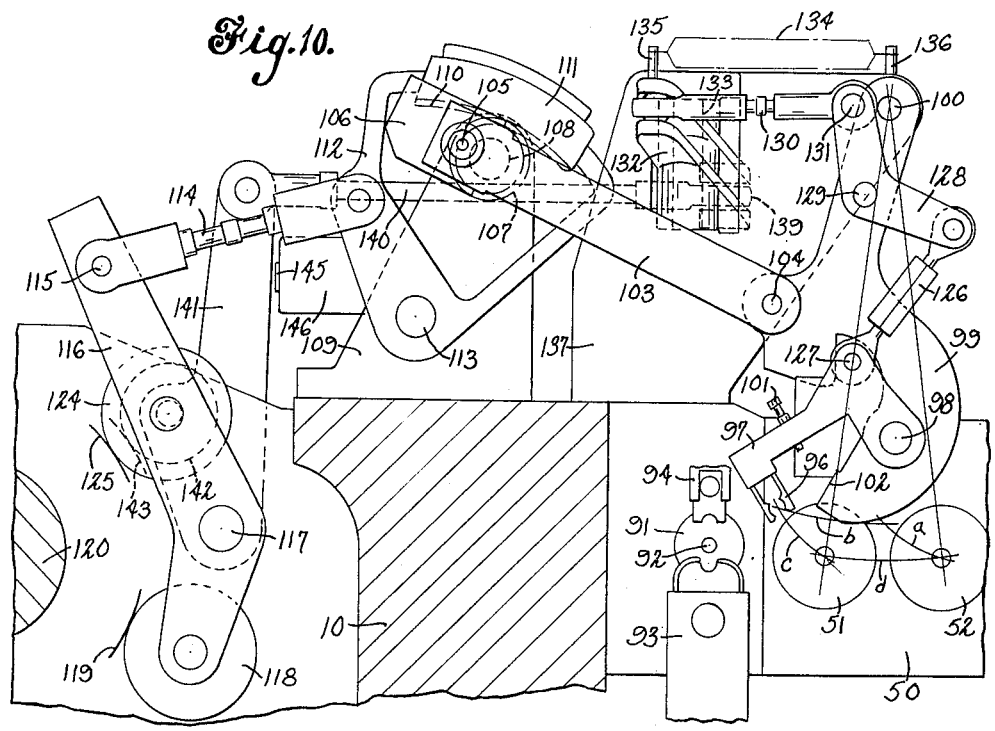

United States Patent Office 3,157,892
Patented Nov. 24, 1964

3,157,892
MACHINE FOR FORMING METAL ARTICLES
Raymond H. Carlson, Rockford, Ill., assignor to Textron Industries, Inc., Rockford, Ill., a corporation of Delaware
Filed Feb. 1, 1960, Ser. No. 5,705
9 Claims. (Cl. 10—12)

This invention relates to an apparatus for forming metal articles and particularly an article provided with a stem or shank and a head of relatively large cross-sectional size with respect to the shank or with respect to at least a part of the shank.

In the manufacture of articles of this type, particularly where the head is considerably larger than the shank of the finished item, it is difficult to form such an article in a header from rod or wire stock of the same size as the shank, and hence it cannot be done by a simple heading operation. It is, therefore, necessary to reduce the cross-sectional size of a portion of the workpiece and then form the head from a part or all of the remainder, the reduction being obtained by an extrusion operation so that the workpiece which is cut from a length of rod or wire is first extruded to reduce the cross-sectional size of a part thereof and is then headed. If desired, all that part of the blank which is to form the shank of the finished product may be reduced in cross section, leaving the larger end portion to form the head.

The present apparatus, therefore, is one designed to first extrude a portion of a workpiece and then form a head upon the unextruded portion and, as illustrated, comprises a machine wherein the heading process is performed by a single blow of the heading tools. That is to say, the machine is provided with a single heading die and a single heading punch and is also provided with an extruding die and an extruding punch and means for transferring the work from the extruding die to the heading die.

The blank or workpiece is cut from a length of stock and may be moved to the extruding station by the cut-off knife, the extruding punch being employed to push the work from the knife into the extruding die and by a continued stroke perform the extruding operation. Thereafter the blank will be carried to the heading station for the heading operation. It may here be noted that the invention particularly relates to an apparatus for effecting reduction of considerable magnitude of the cross-sectional size of the blank at the extruding station.

As illustrated, the impact or extruding punch and the heading punch are mounted upon the same ram or gate so that both punches will have working strokes of the same length. As the heading punch must usually carry a greater load than that imposed upon the impact or extruding punch, the former will be positioned nearer to the center of the ram or gate than the other, the ram being of cylindrical form and supported for reciprocating movement within a housing adjustably mounted on the frame of the machine.

One object of the present invention is to provide a new and improved apparatus for making metal articles, particularly articles provided with a head or shank wherein the workpiece is first extruded and thereafter is headed by a single blow of a heading tool.

A further object of the invention is the provision of a new and improved apparatus for making a headed blank from a workpiece cut from rod or wire stock wherein the blank is first extruded to reduce its cross-sectional size and is thereafter headed at another station in the machine and separate heading and extruding punches are carried by the same gate or ram.

A still further object of the invention is to provide a new and improved apparatus for making a headed blank from rod or wire stock of the character described above wherein the gate or ram is of cylindrical form and mounted to reciprocate in a cylindrical housing secured on the bed of the machine.

A still further object of the invention is to provide means including a crank for actuating the gate or ram of a machine of the character described wherein the crank pin which connects the crank to the ram is provided with bearing members to insure proper operation thereof and prevent any tendency on the part of the ram to rotate about its axis.

Other objects of the invention consist in a provision for adjusting the impact or extruding punch in the ram by which it is carried, for adjusting the heading die in the die block, and for adjusting the entire ram unit laterally on the bed of the machine.

A further object of the invention is to provide a new and improved transfer for carrying the blank from the extruding station to the heading station and for providing an improved knock-out or stripper to strip the work from the heading punch if it clings thereto.

To these and other ends the invention consists in the novel features and combinations of parts to be hereinafter described and claimed.

Figure 2:
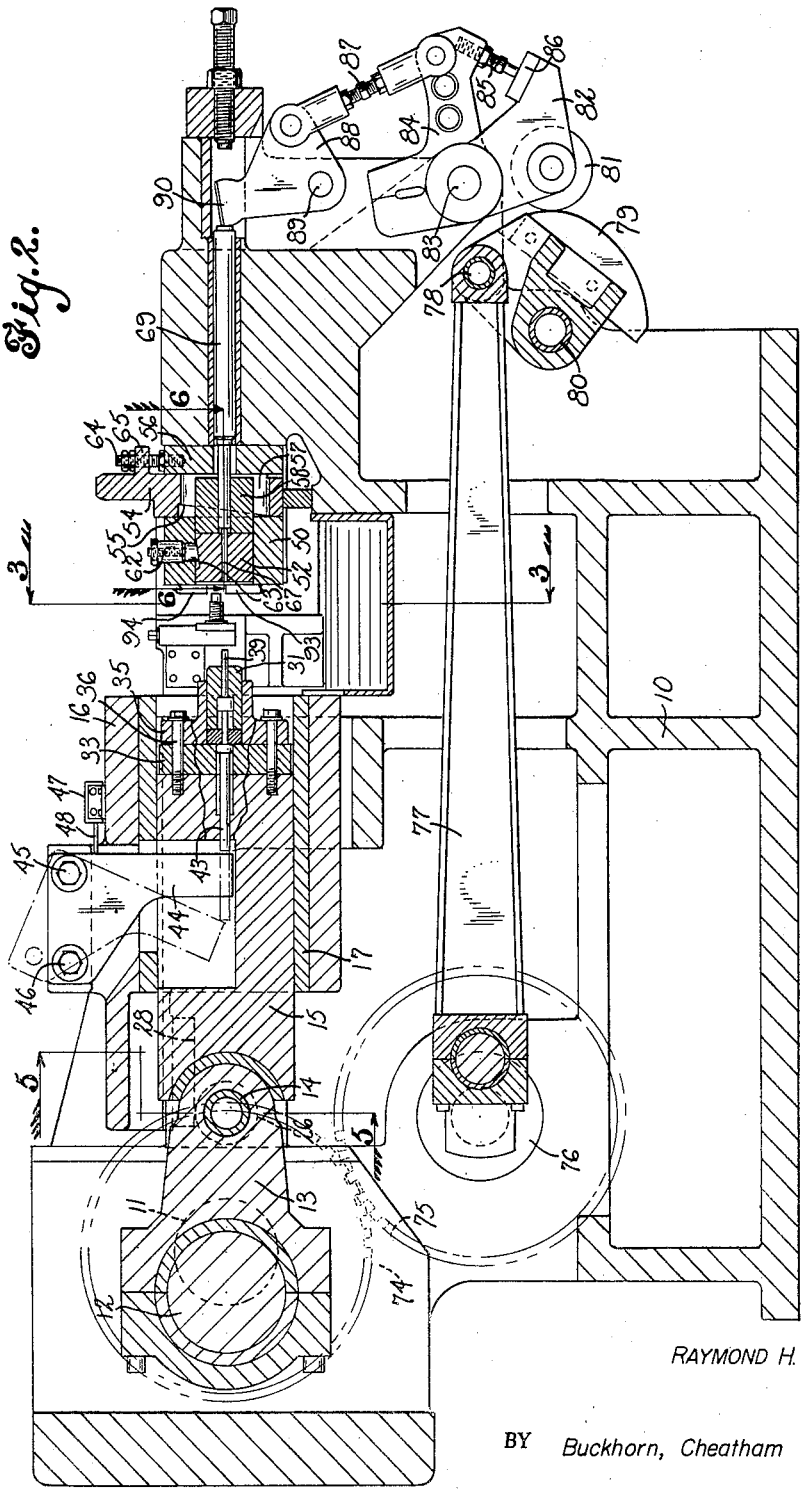
Figure 9:
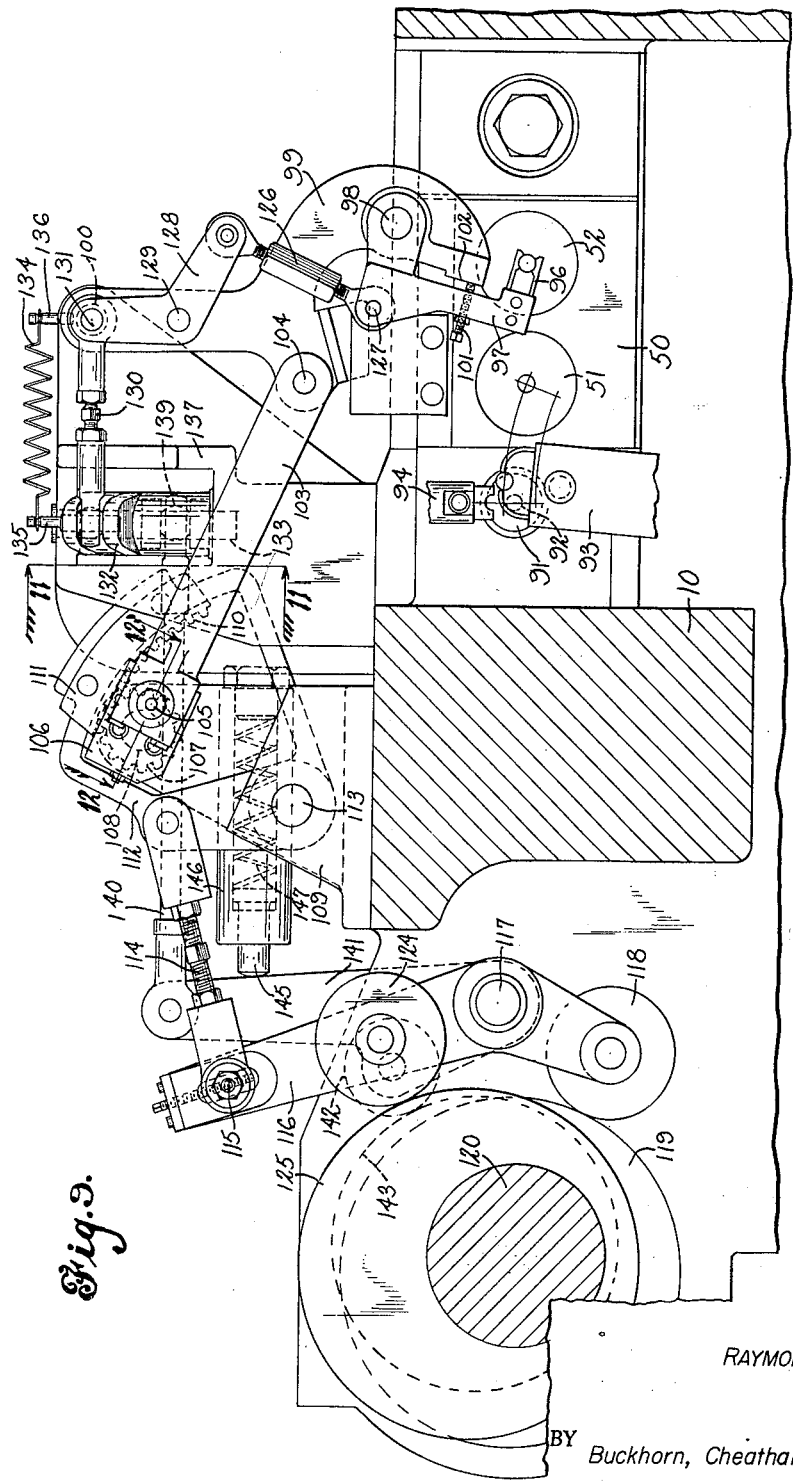

In the accompanying drawings:
FIG. 1 is a top plan view of an apparatus embodying my invention;
FIG. 2 is a sectional view on line 2—2 of FIG. 1;
FIG. 3 is a sectional view on line 3—3 of FIG. 2;
FIG. 4 is a sectional view on line 4—4 of FIG. 3;
FIG. 5 is a sectional view on line 5—5 of FIG. 2;
FIG. 6 is a sectional view on line 6—6 of FIG. 2;
FIG. 7 is a perspective view of the wedge for adjusting the heading die in the die block;
FIG. 8 is a perspective view of the guide block for the knock-out punch of the heading die;
FIG. 9 is a front elevational view of the face of the die block showing the mechanism for transferring the workpiece from the extrusion die to the heading die;
FIG. 10 is a view similar to FIG. 9 showing the parts in another position, some parts being omitted;
FIG. 11 is a sectional view on line 11—11 of FIG. 9; and
FIG. 12 is a sectional view on line 12—12 of FIG. 9.

To illustrate one embodiment of the invention there is shown in the drawings an apparatus comprising a supporting frame designated generally by the numeral 10 in which is mounted a crank shaft 11 having a crank portion 12 thereon. Upon the crank portion 12 is a pitman 13 (FIG. 2) connected by a crank pin 14 to the ram or gate 15 of cylindrical form. This member, as shown in FIG. 3, is circular in cross section.

The ram 15 is mounted within a housing 16 and is embraced by the bearing sleeve 17 fixed within the housing and within which the ram reciprocates. As shown more especially in FIG. 5, the housing 16 is provided with laterally projecting flanges 18 and 19 secured to the bed or frame by bolts 20 and 21 which pass through enlarged openings 22 and 23 in the flanges. This provides for lateral adjustment of the ram unit as a whole with respect to the bed, this adjustment being made by means of the adjusting bolts 24 and 25 threaded in the bed and bearing against the side walls of the housing 16.

Also, as shown more especially in FIG. 5, the crank pin 14 projects laterally from the ram or gate 15 and rollers 26 are mounted on its projecting ends by bearings 27. These rollers bear upon the lower surfaces of bearing plates 28 secured to the rear portion of the housing so as to prevent any tendency of the ram to rotate about its axis during its reciprocating movements.

As previously stated, both the impact punch and the heading punch are provided upon the ram, the impact punch being shown at 30 (FIG. 3) and the heading punch at 31. It may be noted that while both punches are disposed off center with respect to the axis of the ram, the heading punch is closer to the axis than the extruding punch as the former must bear the greater load. As shown in FIG. 4, the impact or extruding punch 30 is carried by a punch holder 32 threadedly mounted in a block 33 in the ram so that it may be adjusted axially thereof. A lock nut 34 threaded upon the punch holder 32 locks the latter in adjusted positions. The block 33 is secured to the ram between the forward face of the latter and a forward member 35, by bolts 36 (FIG. 3) extending through the latter and being threaded into the ram.

The heading punch 31 is secured in the member 35, this punch having an opening 38 therethrough to receive a punch pin 39. The rear portion of the opening 38 is enlarged at 40 to slidably receive an enlargement 41 on the pin 39 so as to limit movement of the latter. The pin engages a head 42 on a knock-out or stripping rod 43 slidably mounted in the ram.

As shown in FIG. 2, this knock-out or stripping rod is adapted to be engaged by an abutment member 44 secured to the housing 16 by pins 45 and 46 and projecting through registering openings in the housing and ram. It will be apparent that when the ram recedes from the work the knock-out rod 43 will strike the forward face of the abutment 44, and, as the latter is stationary with respect to the ram, the knock-out rod will be moved forwardly to eject or strip the work from the punch in the event that it clings thereto.

The pin 46 may be formed of frangible material so that it will break if the ejecting or stripping pin 43 meets with excessive pressure and be permitted to swing in a clockwise direction about the pin 45, as shown in dotted lines in FIG. 2, in order to prevent breakage of the parts. A switch 47 is provided upon the housing 16 having an actuating member 48 held in position by the abutment 44. Thus, when the pin 46 is fractured and the abutment swings to the dotted-line position shown in FIG. 2, the switch will be opened and will cut off current to the driving motor (not shown) to stop the machine.

Referring particularly to FIGS. 2 and 6, a die block 50 is mounted on the bed or frame 10 forwardly of the ram and spaced therefrom. Supported within the die block is an extruding die 51 mounted in position to cooperate with the extruding or impact punch 30, and a heading die 52 in registration with the heading punch 31. The extruding die is held in fixed position by a backing block 53 while the heading die is adjustable in a direction axially of the opening therein. To this end a wedge member 54 is mounted for vertical movement in an opening in the block 50, one face 55 of which is beveled or inclined in a vertical direction. The other face of this member fits against a backing plate 56 (FIG. 6) at the back of the die block 50.

As shown in FIG. 7, the wedge member 54 is provided with a through slot 57 in which is received the stem 58 of a T-shaped member having a head 59 (FIG. 8), the slot 57 being elongated vertically so that the wedge member 54 may be moved vertically with respect to the T-shaped member. The rear surface 60 of the head 59 is beveled complementally to the surface 55. The front face 61 of this T-shaped member bears against the rear face of the die 52, as shown in FIGS. 2 and 6.

The die 52 may be held in place by a set screw 62 bearing at its inner end in a recess 63 in the die, but this screw may be loosened to permit adjustment of the die by the wedge member. The latter is secured to the plate 56 by adjusting screws 64 which pass through openings in a flange 65 on the wedge member 54. It will be apparent from FIG. 2 that adjustment of the screws 64 will raise or lower the wedge member 54, and the beveled forward surface of this member acting upon the beveled surface 60 of the T-shaped block will move the die forwardly or permit it to be moved rearwardly.

A stripping pin 67 is provided in the opening in the die 52, this pin extending rearwardly through an opening 68 of the T-shaped member to be engaged by a knock-out or stripping rod 69 slidably mounted in the frame of the machine. Similarly a stripping or ejecting pin 70 is provided in the extruding die 51 and extends rearwardly to be engaged by an ejecting or stripping rod 71 also slidably mounted in the frame of the machine.

The means for driving the knock-out or stripping rod 69 of the heading die is shown more particularly in FIG. 2. This means, however, is not a part of the present invention and not claimed herein. Upon the crank shaft 11 is secured a gear 74 which drives a gear 75 secured to a crank shaft 76. A pitman 77 pivoted to the latter extends forwardly of the frame and is connected at 78 to a cam member 79 pivoted on the frame at 80 so that upon rotation of the shaft 76 the cam member 79 is oscillated.

This cam is engaged by a follower roller 81 rotatably carried by a lever 82 pivoted to the frame at 83. A further lever 84 also pivoted to the frame at 83 is actuated from the lever 82 by means of an adjustable screw 85 secured to the lever 84 and extending downwardly so that its free end bears against a frangible plate 86 secured to the lever 82. With this construction, if the stripping rod 69 meets with excessive resistance, the plate 86 will be fractured and breakage of other parts will be prevented.

The lever 84 is connected by a turn buckle structure 87 to a lever 88 pivoted to the frame at 89 and having an end 90 engaging the rod 69. With the above construction it will be seen that the pitman is actuated synchronously with the movement of the ram as is also the ejecting rod 69 so that the latter will be moved forwardly to strip the work from the die 52 at the proper time in the operation of the machine. The rod 71 may also, if desired, be actuated by the cam 79.

As shown more especially in FIGS. 9 and 10, a cut-off die 91 is provided on the bed of the machine having an opening 92 through which the stock is fed in order for a length thereof to be severed by means of the knife members 93 and 94. The workpiece, after being severed, is carried to the impact or extruding die 51 by the knife member 93, the latter being moved by means which is not a part of the present invention, and a transfer mechanism is provided to transfer the workpiece or blank from the extruding die 51 to the heading die 52 after the workpiece has been ejected from the extruding die by the ejecting pin 70. To this end suitable transfer fingers 96 to receive the blank when it is ejected from the die 51 are provided upon one end of an L-shaped arm 97 which is pivoted at 98 to a C-shaped finger carrier 99, the latter in turn being pivoted to the frame at 100. An adjusting screw 101 threaded into the arm 97 bears at its free end against a shoulder 102 on the holder 99 so that, when the latter is moved to the left as shown in FIG. 9, the arm 97 will be moved in the same direction.

A link 103 is pivoted at 104 to the holder 99, the other end of this link, as shown in FIG. 12, being pivoted on the pin 105 of a crank member 106 adjustably secured to a gear 107 mounted upon a shaft 108 rotatably mounted on a standard 109 of the frame. The gear 107 is engaged by the teeth 110 of an arcuate rack bar 111 carried on a rack carrier 112 pivoted at 113 on the standard 109. A turn-buckle construction 114 connects the carrier 112 by an adjustable connection 115 to the upper end of a lever 116 pivoted to the frame at 117. The lever 116 is of angular form and at its lower end carries a follower roller 118 engaging a cam 119 on a countershaft 120 (FIG. 1) driven by the crank shaft 11 through gears 122 and 123. A second follower 124 is provided on the lever 116 which engages a second cam 125 mounted upon the same countershaft.

The path through which the transfer fingers are moved is also controlled by a further lever mechanism. This consists of a turn-buckle structure 126 pivoted to the arm 97 at 127 and pivoted at its other end to a bell-crank lever 128 pivoted at 129 to the holder 99. A turn-buckle structure 130 is pivoted at 131 to the other end of this bell-crank lever and pivoted at its other end to a lever 132 pivoted at 133 on the frame (FIG. 11). One end of a tension spring 134 is secured at 135 to the end of the turn-buckle structure 130 and the other end of this spring is secured at 136 to a standard 137 on the frame so that this spring tends to urge the turn-buckle structure toward the right, as shown in FIG. 10, so as to maintain the screw 101 against the shoulder 102 on the member 99.

The remote end of the lever 132 has pivoted thereto at 139 a link 140 pivoted at its other end to a lever 141 pivoted on the frame at 117 coincidently with the lever 116. The lever 141 carries a follower roller 142 adapted to be engaged by a cam member 143 also mounted on the shaft 120.

As shown in FIG. 9, a spring-pressed plunger 145 is mounted in a casing 146 mounted on the frame and urged outwardly by a spring 147. This plunger bears against the edge of the lever 141 so as to maintain the follower 142 against its cooperating cam and tends to urge the connecting linkage between the lever 141 and the arm 97 in the same direction as the spring 134.

In FIG. 9 the transfer fingers are shown opposite the opening in the heading die 52 and it may be assumed that the blank has been pushed from the fingers into the die. Upon rotation of the shaft 120 the lever 141 will be actuated to swing the lever 132 about its pivot and swing the bell-crank lever 128 in a counterclockwise direction which will move the arm 97 about the pivot 98 and swing it away from the shoulder 102 so that the transfer fingers will follow the line designated by the letter "a" in FIG. 10. This moves the transfer fingers upwardly to a position where they will be out of the way of the punch. Continued rotation of the shaft 120 will, by means of the rack 111, crank 106 and link 103, swing the finger carrier 99 about its pivot 100 from the position shown in FIG. 9 to that shown in FIG. 10, while the arm 97 will be correspondingly moved, maintaining its distance from the shoulder 102. At this time the parts will be in the position shown in FIG. 10 and the transfer fingers will have followed the line designated by the letter "b."

Further rotation of the shaft 120 will act upon the lever 141 and again move the arm 97 about the pivot 98 (this pivot having been moved from the position of FIG. 9 to that of FIG. 10), while the latter remains substantially fixed, thus causing the arm 97 to approach the shoulder 102 and the fingers to follow the line designated by the letter "c."

At this time the fingers will lie opposite the opening in the extruding die 51, and the blank will be pushed from the extruding die into the fingers. Thereafter rotation of the shaft 120 will again move the carrier 99 about its pivot 100 to move the carrier from the position shown in FIG. 10 to that shown in FIG. 9 and maintain the adjusting screw 101 of the arm 97 against the shoulder 102. During this movement the transfer fingers will follow the line designated by the letter "d," thus carrying the blank to a position opposite the opening in the heading die at which time the advance of the gate will cause the blank to be pushed into the heading die by the pin 39 of the heading punch.

It will be seen, therefore, that the transfer fingers have a compound movement, moving about the pivot point 98, which in turn is moved about the pivot point 100. The movement about the point 98, generally speaking, effects a movement of the transfer fingers more in a vertical direction than in the horizontal, while the movement of the carrier 99 about the pivot point 100 moves the fingers in a generally horizontal direction.

It may also be noted that the movements of the carrier member about its pivot 100 take place alternately between the movements of the arm 97 which carries the transfer fingers about its pivot 98.

While I have shown and described one embodiment of my invention, it will be understood that it is not to be limited to all of the details shown, but is capable of modification and variation within the spirit of the invention and within the scope of the claims.

What I claim is:

1. A heading machine comprising:
   (a) a frame,
   (b) a housing having a cylindrical opening mounted on said frame;
   (c) a cylindrical ram reciprocably mounted in said opening;
   (d) two punches fixedly mounted on the forward face of said cylindrical ram,
   (e) each of said punches being adapted to coact with a corresponding die mounted on the frame;
   (f) means carried by the frame for reciprocating said ram,
   (g) said means comprising a crank shaft rotatably carried by the frame,
   (h) a pitman having one end connected to said crank shaft,
   (i) a crank pin pivotally connecting the other end of said pitman to said ram,
   (j) the ends of said crank pin extending laterally beyond said ram,
   (k) and guide means mounted on the housing and the extended ends of the crank pin, respectively, and adapted for cooperative engagement with each other to prevent rotation of said ram about its longitudinal axis during its reciprocating movement.

2. A machine according to claim 1 characterized by said guide means including a roller on each extended end of the crank pin, and a single bearing surface on the housing with which each roller engages.

3. A heading machine comprising:
   (a) a frame,
   (b) a ram reciprocably mounted on said frame,
   (c) means on said frame for reciprocating said ram,
   (d) tools for shaping a blank mounted on the forward face of said ram so that during reciprocation of said ram they are fixed against movement relative to said ram in a direction transverse to the direction of reciprocation of said ram,
   (e) said tools consisting of an extruding punch offset on one side of the axis of said ram for extruding a shank portion from one end of a blank while leaving the opposite end portion of said blank substantially unworked, and a heading punch offset on an opposite side of said axis from said extruding punch and at a lesser distance from said axis than said extruding punch for upsetting to its final shape with a single blow the unworked end portion of said blank,
   (f) a pair of dies on said frame, including an extruding die and a heading die, for coacting concurrently with said extruding punch and said heading punch respectively, whereby a finished blank is formed upon each reciprocation of said ram,
   (g) and transfer means on said frame for transferring a blank from said extruding die to said heading die between successive working strokes of said ram.

4. A heading machine comprising:
   (a) a frame,
   (b) a housing having a cylindrical opening mounted on said frame,
   (c) a cylindrical ram reciprocably mounted in said opening,
   (d) means on said frame for reciprocating said ram,
   (e) tools for shaping a blank mounted on the forward face of said ram so that during reciprocation of said ram they are fixed against movement relative to said ram in a direction transverse to the direction of reciprocation of said ram,
   (f) said tools consisting of an extruding punch offset on one side of the axis of said ram for extruding a shank portion from one end portion of a blank while leaving the opposite end portion of said blank in a substantially unworked condition, and a heading punch offset on an opposite side of said axis from said extruding punch and at a lesser distance from said axis than said extruding punch for upsetting with a single blow the unworked opposite end portion of said blank and thereby finish forming a head portion adjoining said shank portion, (g) a pair of dies on said frame, including an extruding die and a heading die, for coacting concurrently with said extruding punch and said heading punch respectively, (h) cooperative guide means mounted between said housing and said ram for preventing rotation of said ram about its longitudinal axis during its reciprocating movement, (i) and transfer means on said frame for transferring said blank from said extruding die to said heading die between successive working strokes of said ram.

5. A heading machine comprising:
(a) a frame,
(b) a housing having an opening mounted on said frame,
(c) a ram reciprocably mounted in said opening,
(d) means carried by said frame for reciprocating said ram,
(e) punch means mounted on the forward face of said ram so that during reciprocation of said ram they are fixed against movement relative to said ram in a direction transverse to the axis of said ram,
(f) die means on said frame, mounted in alignment with said punch means for coaction with the latter,
(g) said housing comprising a unitary, integral structure,
(h) screw threaded means on said frame detachably securing said housing to said frame including means for adjusting said housing transversely of the axis of said opening therein, and thereby aligning said punch means with said die means.

6. A heading machine comprising:
(a) a frame,
(b) a ram reciprocably mounted on said frame,
(c) a punch mounted on the forward face of said ram on one side of the axis of said ram so that during reciprocation of said ram said punch is fixed against movement relative to said ram in a direction transverse to the direction of reciprocation of said ram,
(d) a die mounted on said frame for coaction with said punch,
(e) means carried by said frame for reciprocating said ram, said means comprising:
(f) a crank shaft rotatably carried by the frame,
(g) a pitman, one end of which is connected to said crank shaft,
(h) a crank pin pivotally connecting the other end of said pitman to said ram,
(i) the ends of said crank pin extending laterally beyond said ram,
(j) and guide means mounted on said housing and the extended ends of said crank pin respectively, for cooperative engagement with each other to prevent rotational movement of said ram about its longitudinal axis during its reciprocating movement.

7. A machine according to claim 6 characterized by said guide means including a roller on each extended end of said crank pin, and a single bearing surface on said housing with which each roller engages.

8. A heading machine comprising:
(a) a frame,
(b) a ram reciprocably mounted on said frame,
(c) means on said frame for reciprocating said ram,
(d) a punch mounted on the forward face of said ram so that during reciprocation of said ram said punch is fixed against transverse movement relative to the direction of reciprocation of said ram and against longitudinal movement relative to the face of said ram,
(e) a die mounted on said frame in registration with said punch, said die having an opening therein for receiving a workpiece,
(f) die adjustment means on said frame rearwardly of said die for adjusting said die axially of said opening therein, said means comprising:
(g) a T-shaped member behind said die including a head portion engaging said die and a stem projecting rearwardly from said head portion,
(h) a wedge member mounted on said frame rearwardly of said T-member for adjustment in a direction normal to the direction of adjustment of said die,
(i) said wedge member having a slot therethrough receiving said stem and a beveled front surface engaging a complementally beveled rear surface of said head portion,
(j) whereby adjustment of said wedge member effects a corresponding axial adjustment of said die,
(k) and means for securing said die in its adjusted position.

9. A heading machine comprising:
(a) a frame including a ram housing,
(b) a ram reciprocably mounted in said housing,
(c) means on said frame for reciprocating said ram,
(d) tools for shaping a blank mounted on the forward face of said ram so that during reciprocation of said ram they are fixed against movement relative to said ram in a direction transverse to the direction of reciprocation of said ram,
(e) said tools consisting of an extruding punch offset on one side of the axis of said ram for extruding a shank portion from one end of a blank while leaving the opposite end portion of said blank substantially unworked, and a heading punch offset on an opposite side of said axis from said extruding punch and at a lesser distance from said axis than said extruding punch for upsetting with a single blow the unworked end portion of said blank,
(f) a pair of dies on said frame, including an extruding die and a heading die, for coacting concurrently with said extruding punch and said heading punch respectively,
(g) said extruding punch including a punch pin mounted for adjustment in the direction longitudinally thereof and a screw threaded base member threadedly mounted in the forward end of said ram, said screw threaded base member being accessible for adjustment from the side of the ram in the forward position thereof.

References Cited in the file of this patent
UNITED STATES PATENTS

| | | |
|---|---|---|
| 699,995 | Whitney | May 13, 1902 |
| 1,294,091 | Greene | Feb. 11, 1919 |
| 1,713,071 | Brennan | May 14, 1929 |
| 1,921,654 | Burbank | Aug. 8, 1933 |
| 1,968,128 | Clouse | July 31, 1934 |
| 2,057,418 | Clouse | Oct. 13, 1936 |
| 2,111,046 | Friedman | Mar. 15, 1938 |
| 2,227,810 | Mitchell | Jan. 7, 1941 |
| 2,659,906 | Watt | Nov. 24, 1953 |
| 2,680,860 | Friedman | June 15, 1954 |
| 2,689,359 | Friedman | Sept. 21, 1954 |
| 2,689,361 | Schaeffer et al. | Sept. 21, 1954 |
| 2,781,531 | Byam | Feb. 19, 1957 |
| 2,867,823 | Louis et al. | Jan. 13, 1959 |
| 2,918,333 | Friedman | Dec. 22, 1959 |